2,874,166
Patented Feb. 17, 1959

2,874,166

FLUORO-OLEFINS AND PROCESS FOR PREPARING THEM

Stanley Dixon, Monroe Park, near Wilmington, Del., assignor to E. I. du Pont de Nemours and Company, Wilmington, Del., a corporation of Delaware No Drawing. Application August 14, 1953
Serial No. 374,450

21 Claims. (Cl. 260—346.1)

This invention relates to a new process for preparing fluoro-olefinic compounds and to certain new fluoro-olefins.

Highly fluorinated organic compounds are unusual chemical compounds in that their chemistry differs markedly from their carbon-hydrogen analogues, the fluorine atoms greatly increasing the stability of the compounds and rendering them resistant to many reagents. For example, while ethane is readily oxidized to acetic acid, $CH_3$—COOH, the oxidation of $$CF_3—CH_3 \text{ to } CF_3—COOH$$

cannot be made to occur because of the extreme stability imparted to the compound by the fluorine atoms. For this reason, devious methods of synthesis are often required to obtain desired fluorine-containing compounds, particularly carboxylic acids.

Heretofore alkyl fluoro-olefins have been unknown. Aryl fluoro-olefins have been prepared by a Grignard synthesis and by the process of Balon and Tinker in U. S. Patent No. 2,238,242 in which anhydrous hydrogen fluoride is heated with compounds of the type $$R—CCl_2—CCl_2—R$$

wherein R represents an aryl radical. However, the Grignard reaction is known to have many difficulties and hazards which make it unsatisfactory for many industrial processes. Also, the use of anhydrous HF is often industrially undesirable, requiring special equipment and often presenting special and difficult problems.

It is an object of this invention to provide a simple and novel process for the manufacture of fluoro-olefins from other highly fluorinated olefins of lower molecular weight. Another object is to provide a process for introducing organic radicals having greater reactivity into highly fluorinated olefins, or to produce highly fluorinated olefinic derivatives of other organic compounds. A particular object is to provide novel fluoro-olefins, especially alkyl fluoro-olefins, and a simple and easy process for producing them in high yields. Other objects are to provide new compositions of matter and to advance the art. Still other objects will appear hereinafter.

The above and other objects may be accomplished in accordance with this invention which comprises reacting in an inert organic solvent an organolithium compound and an organic compound having the general formula $$\begin{array}{c} X—C=C—Y \\ | \quad | \\ X \quad F \end{array}$$

where each X represents an electronegative group and Y represents a member of the class consisting of F and perfluoroalkyl radicals, and recovering a product in which the organic radical of the organolithium compound has been attached to at least one of the originally doubly bonded carbon atoms of the organic compound and at least one fluorine atom has been eliminated from the organic compound.

The resulting products are fluoro-olefinic compounds which are gases, liquids or solids at atmospheric temperatures and pressures, depending upon their molecular weight. Such products are soluble in the common organic solvents, such as alcohol, ether, volatile hydrocarbons, and the like. They are useful as monomers in the preparation of fluorine-containing high polymers which, as a class, are known to be particularly resistant to the corrosive action of acids and alkalies. They are also useful as intermediates in the synthesis of a wide variety of other useful fluorine-containing organic compounds. Some of the products, such as trifluorostyrene and difluorostilbene, have been made previously by other methods. When the organic radical of the organolithium compound is an alkyl radical of at least 2 carbon atoms or a heterocyclic radical, and also when Y and one X together represent a divalent perfluorocarbon chain of at least 2 carbon atoms, the products are particularly valuable new compounds. A "perfluorocarbon" chain is one which consists of carbon and fluorine.

It is known that organoalkali metal compounds generally will react with olefins, which contain an aromatic cycle or other unsaturated system directly linked to the olefinic linkage (Gilman's advanced treatise on "Organic Chemistry," vol 1, second edition (1943), page 526), to form complex addition products containing the alkali metal in chemical combination, which are stable and which can be subjected to further reactions, such as carbonation with $CO_2$ to eliminate the alkali metal and form carboxylic acids or their salts. Surprisingly, when an organolithium compound is mixed with a solution of a fluorine-containing organic compound of the class hereinbefore defined, even in the absence of an aromatic cycle or other unsaturated system directly linked to the olefinic linkage, an extremely rapid reaction takes place, even at temperatures as low as −80° C., wherein the organic radical of the organolithium compound becomes attached to at least one of the doubly bonded carbon atoms of the organic compound and at least one fluorine atom is removed from the organic compound, accompanied by the immediate and spontaneous formation of lithium fluoride, LiF, as shown by the immediate precipitation of lithium fluoride from the soluton. Such reaction may be illustrated by the reaction between phenyl lithium and tetrafluoroethylene as shown in the following equations:

$$CF_2=CF_2+C_6H_5Li \rightarrow CF_2=CF—C_6H_5+LiF$$
$$CF_2=CF—C_6H_5+C_6H_5Li \rightarrow$$
$$C_6H_5—CF=CF—C_6H_5+LiF$$

The carrying out of such reaction is independent of the character of the organic radical present in the organolithium compound, as shown by numerous tests, but is dependent upon the character or structure of the fluorine-containing organic compound which must have a structure corresponding to that hereinbefore defined. No reaction occurred when each of 1,2-dichloro-1,2-difluoro-ethylene (CFCl=CFCl) and difluoroethylene $$(CH_2=CF_2)$$

which do not have the structure of the organic compounds of this invention, were treated with organolithium compounds by the process of this invention.

The organolithium compounds contain a carbon-lithium linkage, that is, the lithium is linked directly to a carbon atom of an organic radical, and may be represented by the formula RLi where R represents an organic radical in which the free valence belongs to a carbon atom. The organic radical may be the radical of any organic compound which can be caused to form an organolithium compound. Many of such organolithium compounds and the methods of making them are well-known. Some are disclosed by Gilman et al. in J. A. C. S. 71, 1499 (1949), on pages 517–518 of "Organic Synthesis," collective vol. II (1943), and on pages 493–539 of Gilman's "Organic Chemistry," vol. 1, second edition (1943). The preferred organolithium compounds are those in which the organic radicals are hydrocarbon radicals, particularly the alkyl lithiums in which the organic radicals are alkyl radicals of at least 2 carbon atoms, including those containing up to 18 carbon atoms at least, and the aryl lithiums. The alkyl lithiums are represented by ethyl lithium, propyl lithium, butyl lithium, amyl lithium, and dodecyl lithium. The aryl lithiums are represented by phenyl lithium, the tolyl lithiums, the xylyl lithiums, the naphthyl lithiums, the diphenyl lithiums, and the fluoryl lithiums. Other hydrocarbon lithiums are represented by benzyl lithium and 2,3-diphenylindene-1-lithium. The next preferred class of organolithium compounds are those in which the organic radical is a heterocyclic radical in which the free valence belongs to a carbon atom. Such heterocyclic lithiums are represented by 2-furyl lithium, 2-pyridyl lithium, 2-thienyl lithium, picolyl lithium, 9-xanthyl lithium, 4-dibenzofuryl lithium, their isomers and homologues thereof. Other organolithium compounds within this invention include hydroxyaryl lithiums, such as o-hydroxyphenyl lithium, and dialkylaminophenyl lithiums, such as p-dimethylaminophenyl lithium. Still other organolithium compounds will be apparent to those skilled in the art, non-hydrocarbon substituents on the organic radical not affecting the operability of the organolithium compound in the reaction but only affecting the preparation of the organolithium compound.

The other reactant, the fluorine-containing organic compound which is to be reacted with the organolithium compound, must have the general formula $$X-\underset{X}{C}=\underset{F}{C}-Y$$

wherein each X represents an electronegative group and Y represents a member of the class consisting of fluorine and perfloroalkyl radicals. In other words, the fluorine-containing organic compound must be a fluoro-olefin, including the cyclic fluoro-olefins, in which there are two fluorine atoms or one fluorine atom and a perfloroalkyl radical on one of the doubly bonded carbon atoms, and two electronegative groups on the other doubly bonded carbon atom. A "doubly bonded carbon atom" is one which is linked directly to another carbon atom by a double bond. An "electronegative group" is an element or an organic radical which has a tendency to withdraw electrons from a normal covalent bond, and is more electronegative than hydrogen. When such groups are attached to a carbon atom, the electron pair, which it shares with the carbon atom, can be visualized as being farther from the carbon atom and closer to the electron attracting group. Representative electronegative groups are the halogens, preferably fluorine or chlorine, and cyano (—CN), perfluoroalkyl, and phenyl radicals. Y and one X together may be a divalent perfluorocarbon chain of at least 2 carbon atoms, such as —CF₂—CF₂—, which forms a cyclic ring with the doubly bonded carbon atoms, i. e. a cyclic fluoro-olefin nucleus, and serves both as a perfluoroalkyl group represented by Y and as an electronegative group represented by one X.

Such fluorine-containing organic compounds, which may be reacted with an organolithium compound in accordance with this invention, are illustrated by Tetrafluoroethylene, CF₂=CF₂
Chlorotrifluoroethylene, CFCl=CF₂
1,1-dichloro-2,2-difluoroethylene, CCl₂=CF₂
Perfluoropropene, CF₂=CF—CF₃
Perfluoroheptene-1, CF₂=CF—(CF₂)₄—CF₃
8-hydroperfluoro-octene-1, CF₂=CF—(CF₂)₅—CF₂H Phenyltrifluoroethylene
(trifluorostyrene)

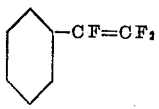

1-phenylperfluoropropene-1,2
(α:β-difluoro-β-trifluoromethylstyrene)

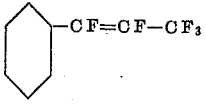

8-hydro-1-phenylperfluoro-octene-1

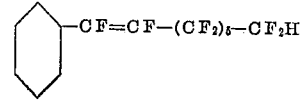

α-Phenylperflorohexptene-1

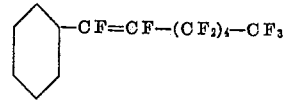

Perfluorocyclobutene

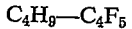

Monobutylperfluorocyclobutene

C₄H₉—C₄F₅

An important feature of the present invention is the production of certain new fluoro-olefinic compounds which have valuable novel properties and which apparently cannot be made by previously known methods. One class of such new fluoro-olefinic compounds has the general formula

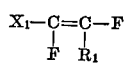

wherein X₁ represents a halogen atom and R₁ represents an alkyl radical of at least 2 carbon atoms, preferably from 2 to 18 carbon atoms. Representative members of such class are ethyl trifluoroethylene C₂H₅—CF=CF₂, n-butyl trifluoroethylene C₄H₉—CF=CF₂, 1-n-butyl-2-chloro-1,2-difluoroethylene C₄H₉—CF=CFCl and n-dodecyltrifluoroethylene C₁₂H₂₅—CF=CF₂. Such alkyl fluoro-olefins can be polymerized or copolymerized with other polymerizable organic compounds by known methods to form high polymers which are resistant to the corrosive action of acids and alkalies, which contain hydrocarbon radicals and which can be subjected to most of the reactions characteristic of high polymers of hydrocarbon olefins. Such alkyl fluoro-olefins can be halogenated by known methods to saturate the double bonds, and further to replace hydrogen atoms with halogen atoms.

The alkyl fluoro-olefins are particularly valuable as intermediates for the production of fluorine-containing carboxylic acids, especially fluorine-containing olefinic carboxylic acids, which are strong acids, the fluorine-containing olefinic carboxylic acids being particularly valuable in the production of polymeric materials. It is well known that CF₃—CH₃ cannot be oxidized to

because of the extreme stability imparted by the fluorine atoms, and CF₂=CF—CH₃ cannot be converted to

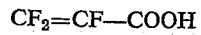

On the other hand, the alkyl fluoro-olefins of this invention can be subjected to successive halogenations and dehydrohalogenations (by treatment with KOH in conventional manner) to introduce a double bond at any desired position in the alkyl radical, thereby producing other fluorine-containing olefinic compounds. Such other olefinic compounds can then be oxidized, as by permanganate solutions in the manner disclosed by Henne in Patent No. 2,371,757, to break the double bond and form a carboxylic acid. The elimination of halogen from such carboxylic acid, as by treating it with zinc in the conventional manner, produces a fluoro olefinic carboxylic acid. Such series of reactions are illustrated by the following equations:

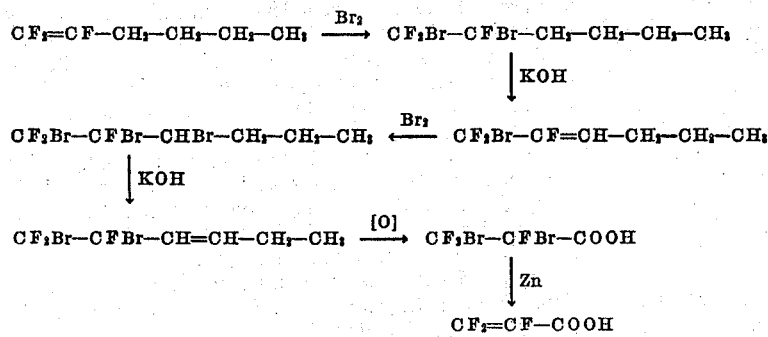

By continuing the bromination and dehydrobromination before oxidation, the double bond in the alkyl group and the carboxyl group can be placed at any desired distance from the fluorine atoms, depending upon the length of the alkyl chain. Thus, the alkyl fluoro-olefins of this invention can be converted to a wide variety of derivatives, including halogenated derivatives, olefinic derivatives, carboxylic acids and, particularly, fluoro-olefinic carboxylic acids.

Another important class of new compounds of this invention consists of those having the general formula

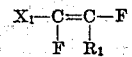

wherein $X_1$ represents a halogen atom and $R_1$ represents a heterocyclic radical in which the free valence belongs to a carbon atom. Representative members of such class are 2-(2-chloro-1,2-difluorovinyl)furan, 2-(2-chloro-1,2-difluorovinyl)pyridine, and 2-(2-chloro-1,2-difluorovinyl)thiophene. Such heterocyclic fluoro-olefins can be halogenated to saturate the double bond and the heterocyclic portion therein may be subjected to reactions characteristic of the heterocyclic compounds, giving derivatives which are stabilized by the fluorine atoms. They can be polymerized or copolymerized with other polymerizable organic compounds, such as tetrafluoroethylene, to produce high polymers which contain the heterocyclic polar groups which can be reacted with other materials to confer specific properties to the polymer, particularly color.

A further valuable class of new compounds of this invention consists of those obtained by the reaction of an organolithium compound with a cyclic fluoro-olefin of the formula

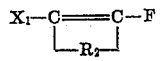

wherein $X_1$ represents a halogen atom and $R_2$ represents a divalent perfluorocarbon chain of at least 2 carbon atoms, such cyclic fluoro-olefins being represented by perfluorocyclobutene, resulting in compounds having one of the general formulae

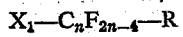

or

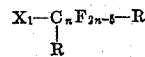

wherein $X_1$ represents a halogen atom, each R represents a hydrocarbonalkyl radical in which the free valence belongs to a carbon atom, and each of $C_nF_{2n-4}$ and $C_nF_{2n-5}$ represents a cyclic olefinic fluorocarbon nucleus in which $n$ is an integer of from 4 to 6. Such compounds are illustrated by monobutyl perfluorocyclobutene and dibutyl perfluorocyclobutene. Such compounds may be halogenated to saturate the double bond, or polymerized or copolymerized with other polymerizable organic compounds to yield high polymers containing the organic groups which will undergo further reactions, including, particularly in the case of the heterocyclic compounds, with color-forming groups. They are especially valuable in the production of keto-carboxylic acids by treatment with an oxidizing agent, such as chromic acid, whereby oxidation occurs with breaking of the double bond as shown by the following equation:

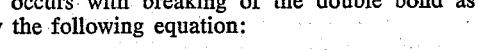
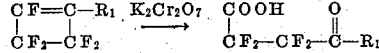

The process is carried out in a rather simple manner. The organolithium compound is dissolved in an inert organic solvent and the fluorine-containing organic compound is slowly passed into the solution, usually in excess of that required for complete reaction with the organolithium compound, conveniently from about 10% to about 50% excess. Usually, nitrogen is introduced with the fluorine-containing organic compound so as to provide and maintain a non-oxidizing atmosphere. The temperature employed will depend upon the fluorine-containing organic compound and generally will be such as to retain a material amount of the fluorine-containing organic compound in the solution and to avoid extreme pressures and the hazards involved therein. Preferably, the temperature will be one at which the fluorine-containing organic compound is liquid at atmospheric pressure, i. e., between its freezing point and its normal boiling point, although somewhat higher temperatures are sometimes convenient where the compound can be maintained liquid by the application of slight to moderate pressures. Ordinarily, it is most convenient to operate at temperatures of from about −30° C. to about −80° C. particularly with the lower boiling compounds.

The inert organic solvent employed generally will depend upon the temperature at which the reaction is to be carried out, and will be one which is liquid and hence retains its solvent properties at such temperature. Preferably, the solvent will be volatile so that it can be readily separated from the product by evaporation or distillation, most of the products being relatively non-volatile. Ether is a particularly satisfactory inert solvent. Other suitable inert solvents include other ethers, petroleum ether and volatile saturated hydrocarbons generally, e. g., hexane and butane.

The reaction appears to take place rapidly, as shown by the immediate precipitation of LiF from the solution. However, it is generally desirable to maintain the reactants in contact for some time to ensure maximum yields. Then the reaction mixture will usually be brought substantially to room temperature for separation of the LiF. The LiF may be removed by filtration or by treatment with an aqueous solution of hydrochloric acid which reacts with any lithium hydroxide that may be formed by hydrolysis of unreacted organolithium compound.

When the LiF is removed by filtration, the solvent will be removed by evaporation or distillation and the residue subjected to fractional distillation to recover the product. When the reaction mixture is treated with aqueous hydrochloric acid, it will usually be desirable to first remove the solvent and then extract the aqueous solution with ether or other solvent. The resulting extracts can then be subjected to evaporation and fractional distillation to recover the product.

It will be apparent that such process is simple and easy to operate and avoids the difficulties, hazards and problems of the previous processes, such as the Grignard synthesis and the HF process. Furthermore, it gives good yields of the products, much higher than can be obtained by the Grignard synthesis.

In order to more clearly illustrate this invention, preferred modes of carrying it into effect, and the advantageous results to be obtained thereby, the following examples are given:

EXAMPLE I

*The reaction between tetrafluoroethylene and phenyl lithium*

A solution of phenyl lithium (25 g.) in ether (1000 cc.) is cooled to —50° C. and a mixture of tetrafluoroethylene and nitrogen slowly passed in until a total of 30 g. (100% excess) of the olefine has been added. The mixture is then allowed to warm up to room temperature and the precipitated lithium fluoride removed by filtration. Evaporation of the ether yields a solid which, on recrystallization from dilute ethyl alcohol, gives colorless plates, M. P. 74° C. of difluorodiphenylethylene; 8 g. (25%). Found: C, 77.7; H, 4.5; F, 17.6%; M. W., 218. $C_{14}H_{10}F_2$ requires C, 77.7; H, 4.6; F, 17.6%; M. W., 216.

Oxidation of the difluorodiphenylethylene with potassium dichromate and sulfuric acid yields benzil in good yield proving its structure to be that of $\alpha,\alpha'$-difluorostilbene (I).

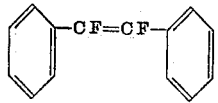

(I)

EXAMPLE II

*The reaction between chlorotrifluoroethylene and phenyl lithium*

A solution of phenyl lithium (50 g.) in ether (1200 cc.) is cooled to —80° C. and a mixture of chlorotrifluoroethylene and nitrogen slowly passed in until a total of 100 g. (50% excess) of the olefine has been added. The mixture is then allowed to warm up to room temperature and the precipitated lithium fluoride removed by filtration. Evaporation of the ether yields more lithium fluoride together with a brown liquid which is distilled, B. P. 172–174° C. Analysis shows this material to be chlorodifluorostyrene (II), 49 g. (50%). Found: C, 55.4; H, 2.8; Cl, 20.4%; M. W. 167. $C_8H_5ClF_2$ requires C, 55.0; H, 2.9; Cl, 20.4; M. W. 174. The material strongly reduces potassium permanganate solution and bromine.

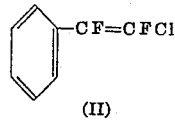

(II)

EXAMPLE III

A mixture of phenyl lithium (32 g.) and 180 cc. of ether was placed in a bomb and heated to 50° C., and 100 g. of chlorotrifluoroethylene, also at 50° C., was passed in under pressure. The bomb and its contents was held at 50° C. for 4.5 hours during which time the contents were continuously agitated. The bomb contents were then decomposed with water and the product worked up in the usual way. After fractionally distilling the crude product chlorodifluorostyrene was obtained B. P. 174° C.) in good yield.

EXAMPLE IV

*The reaction between tetrafluoroethylene and n-butyl lithium*

A solution of n-butyl lithium (242 g.) in ether (4000 cc.) is cooled to between —70° C. and —80° C. and a mixture of tetrafluoroethylene and nitrogen slowly passed in until a total of 450 g. (20% excess) of the olefine has been added. The solution is then allowed to warm up to room temperature at which time it is treated with water and dilute hydrochloric acid. The aqueous layer is extracted with ether. The combined ether extracts are washed with water and finally dried over calcium sulfate. Evaporation of the ether yields a light brown liquid which, on fractionation, yields 302 g. of clear colorless liquid, B. P. 66° C., shown by analysis to be n-butyltrifluoroethylene (III). It is strongly reducing towards potassium permanganate solution. Found: C, 51.5; H, 6.7%. $C_6H_9F_3$ requires C, 52.0; H, 6.5%. Yield 58%.

$$C_4H_9\text{---}CF\text{=}CF_2$$

(III)

Bromination yields a liquid dibromide, B. P. 170° (66° C./12 mm.). Found: C, 24.0; H, 3.07; Br, 52.3%. $C_6H_9Br_2F_3$ requires C, 24.2; H, 3.02; Br, 52.7%.

EXAMPLE V

*The reaction between 1,1-dichloro-2,2-difluoroethylene and phenyl lithium*

A solution of phenyl lithium (50 g.) in ether (1200 cc.) is cooled to —80° C. and a mixture of 1,1-dichloro-2,2-difluoroethylene and nitrogen slowly passed in until a total of 100 g. (25% excess) of the olefine has been added. The solution is then allowed to warm up to room temperature and the ether removed under reduced pressure. The residue is treated with dilute hydrochloric acid and the resultant aqueous solution extracted with ether. The combined ether extracts are washed with water and finally dried over calcium chloride. Evaporation of the ether yields a light brown liquid (51 g.) which is fractionated as follows:

| | Grams |
|---|---|
| Cut #1, B. P. 30–79° C./12 mm | 1.6 |
| Cut #2, B. P. 79–89° C./12 mm | 4.2 |
| Cut #3, B. P. 95–100° C./12 mm | 7.8 |
| Cut #4, B. P. 101°/12 mm | 35.0 |

Cut #4 is shown by analysis to be the desired $\alpha$-fluoro-$\beta$-$\beta$-dichlorostyrene (IV) (1 - fluoro - 1 - phenyl-2,2-dichloroethylene). It readily reduced potassium permanganate solution. Found: C, 50.3; H, 2.8; Cl, 37.5; F, 9.0%; M. W. 193. $C_8H_5FCl_2$ requires C, 50.2; H, 2.6; Cl, 37.2; F, 9.9%; M. W. 191.

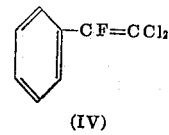

(IV)

EXAMPLE VI

*The reaction between chlorotrifluoroethylene and n-butyl lithium*

A solution of n-butyl lithium (81 g.) in ether (1500 cc.) is cooled to —80° C. and a mixture of chlorotrifluoroethylene and nitrogen slowly passed in until a total of 180 g. (20% excess) of the olefine has been added. The solution is then allowed to warm up to room temperature at which time it is treated with water and dilute hydrochloric acid. The aqueous layer is extracted several times with ether and the extracts dried over calcium sulfate. Evaporation of the ether yields a dark brown liquid which is fractionated as follows:

| | Grams |
|---|---|
| Cut #1, B. P. 40–80° C | 2 |
| Cut #2, B. P. 82–89° C | 14 |
| Cut #3, B. P. 89–92° C | 9.5 |
| Cut #4, B. P. 108–109° C | 44 |
| Black residue (decomposed) | 19 |

Cut #4 is the required 1-chloro-1,2-difluoro-n-hexene-1 (V) (1-butyl-2-chloro-1,2-difluoroethylene). Found: C, 47.3; H, 5.9; Cl, 22.8; F, 23.8%. $C_6H_9ClF_2$ requires C, 46.6; H, 5.8; Cl, 23.0; F, 24.6%. It is strongly reducing to potassium permanganate.

$$C_4H_9 \cdot CF=CFCl$$
(V)

EXAMPLE VII

*Reaction of n-dodecyl lithium with tetrafluoroethylene*

A solution of n-dodecyl lithium (35 g.) in ether (500 cc.) is cooled to −80° C. and a mixture of tetrafluoroethylene and nitrogen slowly passed in until an excess of the olefine has been added (greater than 20 g.). The solution is then allowed to warm up to room temperature at which time it is treated with water and dilute hydrochloric acid. The aqueous layer is extracted several times with ether and the extracts dried over calcium sulfate. Evaporation of the solvent yields an oil (50 g.) together with a small amount of the paraffin $C_{24}H_{50}$. Fractionation of the oil yields the desired n-dodecyl trifluoroethylene (VI), a water white liquid, B. P. 70° at 1 mm. pressure. Yield 25 g.; 51%. Found: C, 67.4; H, 9.9; F, 22.6%. $C_{14}H_{25}F_3$ requires C, 67.2; H, 10.0; F, 22.8%.

$$C_{12}H_{25} \cdot CF=CF_2$$
(VI)

EXAMPLE VIII

*Reaction of phenyl lithium with perfluoropropene*

A solution of phenyl lithium (38 g.) in ether (650 cc.) is cooled to −80° C. and a mixture of perfluoropropene and nitrogen slowly passed in until a total of 80 g. (10% excess) of the olefine has been added. The solution is then allowed to warm up to room temperature at which time it is treated with water and dilute hydrochloric acid. The aqueous layer is extracted several times with ether and the extracts dried over calcium sulfate. Evaporation of the ether yields a brown liquid which is fractionated as follows:

| | Grams |
|---|---|
| Cut #1, B. P. 148° C. at 760 mm | 53 |
| Cut #2, B. P. 130–133° C. at 12 mm | 20 |

Cut #1 is the required trifluoromethyl difluorostyrene, probably α,β-difluoro-β-trifluoromethylstyrene, a water white liquid (VIIA). Found: C, 51.5; H, 2.6%; M. W. 207 in $CCl_4$. $C_9H_5F_5$ requires C, 51.9; H, 2.4%; M. W. 208.

Cut #2 solidifies on cooling and, when recrystallized from petroleum ether (30°–60°), yields long colorless needles, M. P. 38° C. It is α-fluoro-β-trifluoromethyl stilbene (VIIB). Found: C, 68.0; H, 3.8%; M. W. 268. $C_{15}H_{10}F_4$ requires C, 67.7; H, 3.7%; M. W. 266.

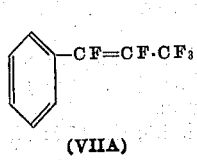
(VIIA)

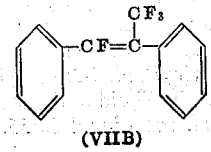
(VIIB)

EXAMPLE IX

*The reaction of methyl lithium with tetrafloroethylene*

A solution of methyl lithium (20 g.) in ether (1000 cc.) is cooled to −80° C. and a mixture of nitrogen and tetrafluoroethylene is slowly passed in until an excess of the olefine has been added. The solution is then allowed to warm up to room temperature and the precipitate filtered off. This is shown to be lithium fluoride.

In the subsequent working up of this reaction mixture in the manner of Example I, the product, a low boiling gas, was lost, but is believed to be methyl trifluoroethylene, $CH_3—CF=CF_2$.

EXAMPLE X

*The reaction of methyl lithium with chlorotrifluoroethylene*

A solution of methyl lithium (20 g.) in ether (1000 cc.) is cooled to −80° C. and a mixture of nitrogen and chlorotrifluoroethylene slowly passed in until an excess of the olefine has been added. The solution is then allowed to warm up to room temperature and the precipitated solid removed by filtration. This is shown to be lithium fluoride.

In the subsequent working up of this reaction mixture in the manner of Example I, the produce, a low boiling gas, was lost, but is believed to be methyl chlorodifluoroethylene, $CH_3—CF=CFCl$.

EXAMPLE XI

*The reaction of ethyl lithium with tetrafluoroethylene*

An ether solution (700 cc.) of ethyl lithium (32 g.) is cooled to −80° C. and treated with a mixture of tetrafluoroethylene and nitrogen until a slight excess of the olefine has been added. The mixture is then allowed to warm to room temperature, 52 g. of expelled gases being collected in traps at −80° C. Fractional distillation of this low-boiling material yields 5 g. of ethyl trifluoroethylene (a), B. P. +13° C. in addition to an azeotrope of ethyl trifluoroethylene with ethyl ether. The original reaction mass is treated with water (250 cc.) and the ether layer separated. Fractionation of this layer yields 9 g. more ethyl trifluoroethylene and more azeotrope. Molecular weight, found 109.5, calculated 110.

$$C_2H_5 \cdot CF=CF_2 \qquad C_2H_5 \cdot CFBr \cdot CF_2Br$$
(a) \qquad\qquad (b)

The compound may be converted quantitatively to its dibromide (b), B. P. 125° C. by mixing carbon disulfide solutions of the olefine with bromine.

Found: C, 17.8; H, 1.90%. $C_4H_5Br_2F_3$ requires C, 17.8; H, 1.9%.

EXAMPLE XII

*The reaction of phenyl lithium with 8-hydroperfluoro-octene-1*

An ether solution (500 cc.) of phenyl lithium (15 g.) is cooled to −80° C. and treated with 8-hydroperfluoro-octene-1 (68 g.) in a nitrogen atmosphere. When the addition of olefine is complete, the reaction is allowed to warm to room temperature where it is treated with water (100 cc.) and enough hydrochloric acid to produce clear solutions. The ether layer is separated and the aqueous layer extracted with ether several times. The combined extracts are dried and finally evaporated to yield a brown liquid. Fractional distillation yields 8-hydro-1-phenyl perfluoro-octene-1 (c), B. P. 72° C./2 mm. (22 g.) and α-fluoro-β-6-hydroperfluorohexylstilbene (d), B. P. 138° C./2 mm. (16 g.). The stilbene derivative (d) is recrystallized from aqueous alcohol to form long white needles, M. P. 69° C.

(c) Found: C, 37.6; H, 1.5%. $C_{14}H_6F_{14}$ requires C, 38.2; H, 1.5%.

(d) Found: C, 48.4; H, 2.3%. $C_{20}H_{11}F_{13}$ requires C, 48.2; H, 2%.

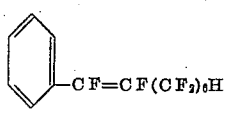

(c)

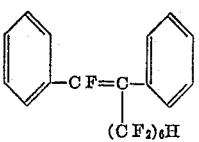

(d)

EXAMPLE XIII

*The reaction of phenyl lithium with perfluoroheptene-1*

To a solution of phenyl lithium (10 g.) in ether (400 cc.), cooled to −80° C., is added, dropwise, perfluoroheptene-1 (40 g.), a nitrogen atmosphere being maintained throughout. When all the olefine is added, stirring is continued for 2 hours and the mixture then allowed to warm to room temperature, at which point water is added. The ether layer is separated and the aqueous layer extracted several times with more ether. The combined extracts are dried and evaporated to yield a dark brown oil, part of which crystallizes.

The oil is fractionally distilled.

A. Cut #1, B. P. 80° C./6 mm., 19 g.
B. Cut #2 B. P. 106° C./6 mm., 8 g., solidifies.

A is shown by analysis to be the styrene derivative. Found: C, 38.5; H, 1.2%. $C_{13}H_5F_{13}$ requires C, 38.3; H, 1.2%.

B is shown by analysis to be the stilbene derivative. Found: C, 48.8; H, 2.3%. $C_{19}H_{10}F_{12}$ requires C, 48.9; H, 2.1%.

It may be recrystallized from alcohol-water to give long colorless needles, M. P. 73° C.

A and B are believed to have the following structures:

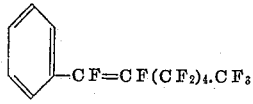

(A)

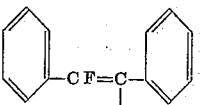

(B)

EXAMPLE XIV

*Reaction with a cyclic perfluoro-olefine*

41.5 g. of n-butyl lithium was dissolved in ether, cooled to −80° C. and 122 g. of perfluorocyclobutene passed in. After warming to room temperature, the reaction mass is worked up in the usual manner to give a dark crude product which, on fractional distillation, gave two distinct fractions:

*Cut #1.*—25 g. of material giving positive test for unsaturation. Analysis for monobutyl perfluorocyclobutene, $C_8H_9F_5$. Found/calc.: C=46.7/48.0; H=4.3/4.5; F=43.7/47.5.

*Cut #2.*—50 g. of unsaturated material. Analysis for dibutyl derivative, $C_{12}H_{18}F_4$. Found/calc.: C=60.5/60.5; H=7.6/7.6; F=30.5/31.9.

EXAMPLE XV

*The reaction of 2-furyl lithium with chlorotrifluoroethylene*

An ether solution (800 cc.) of 2-furyl lithium (35 g.) is cooled to −80° C. and treated with a mixture of chlorotrifluoroethylene and nitrogen until a 10% excess of the olefine has been added. The mixture is then allowed to warm to room temperature where it is treated with water (400 cc.). The ether layer is separated and the aqueous layer extracted several times with ether, the combined extracts dried and finally evaporated to yield a dark brown residue. Fractional distillation of the residue gives 72 g. of 2-(2-chloro-1,2-difluorovinyl)-furan (e), B. P. 135° C. Found: C, 43.6; H, 1.9; Cl, 21.7%. $C_6H_3ClF_2O$ requires C, 43.8; H, 1.8; Cl, 21.6%.

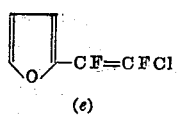

(e)

EXAMPLE XVI

*The reaction of 2-pyridyl lithium with chlorotrifluoroethylene*

An ether solution (1000 cc.) of 2-pyridyl lithium (30 g.) is cooled to −70° C. and treated, with constant agitation, with a mixture of chlorotrifluoroethylene and nitrogen until an excess of the olefine has been added. The mixture is then allowed to warm up to room temperature where it is treated with water (600 cc.). The ether layer is separated and the aqueous layer extracted several times with ether. The combined extracts are dried and then evaporated to yield a black liquid which is fractionally distilled to yield 30 g. of 2-(2-chloro-1,2 difluorovinyl)pyridine (f), a water-white liquid, B. P. 115° C./16 mm. Found: C, 48.5; H, 2.6; Cl, 21.0; N, 8.3%. $C_7H_4ClF_2N$ requires C, 48.0; H, 2.3; Cl, 20.3; N, 8.0%.

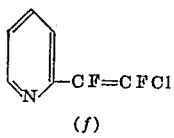

(f)

EXAMPLE XVII

*The reaction of 2-thienyl lithium with chlorotrifluoroethylene*

An ether solution (750 cc.) of 2-thienyl lithium (50 g.) is cooled to −80° C. and treated with a mixture of chlorotrifluoroethylene and nitrogen until a slight excess of the olefine has been added. The mixture is then allowed to warm to room temperature, at which point it is treated with water (600 cc.). The ether layer is separated and the aqueous layer extracted several times with ether. The combined extracts are dried and finally evaporated to yield a deep red mobile liquid. Fractional distillation yields 54 g. of 2-(2-chloro-1,2-difluorovinyl) thiophen (g), B. P. 97° C./16 mm. Found: C, 39.9; H, 1.7; Cl, 19.7; S, 18.6%. $C_6H_3ClF_2S$ requires C, 39.9; H, 1.7; Cl, 19.7; S, 17.7%.

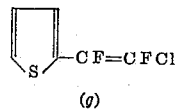

(g)

EXAMPLE XVIII

*The reaction of p-dimethylaminophenyl lithium with chlorotrifluoroethylene*

An ether solution (600 cc.) of p-dimethylaminophenyl lithium (100 g.) is cooled to −80° C. and treated with a mixture of chlorotrifluoroethylene and nitrogen until a 10% excess of the olefine has been added. The mixture is then allowed to warm to room temperature where it is carefully treated with water (300 cc.). The ether layer is separated and the aqueous layer is extracted with ether several times. The combined extracts are dried and finally evaporated to yield a dark liquid residue. Fractionation yields two fractions, (a) 45 g. of a colorless liquid, B. P. 87° C. at 2 mm., (b) 55 g. of a solid, B. P. 92° C./2 mm.; the solid may be recrystallized from alcohol-water to give pale yellow plates M. P. 54° C. These are cis-trans isomers of the desired compound p-(2-chloro-1,2 difluorovinyl)-N,N-dimethylaniline (h). Long heating converts the liquid to the solid form.

*Found.* (a) Liquid C, 55.1; H, 4.6; Cl, 16.3; N, 6.5%, (b) solid C, 54.9; H, 4.7. $C_{10}H_{10}ClF_2N$ requires C, 55.2; H, 4.6; Cl, 16.3; N, 6.4%.

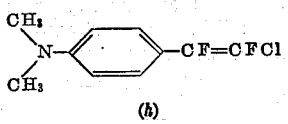

(h)

It will be understood that the preceding examples are given for illustrative purposes solely and that this invention is not limited to the specific embodiments disclosed therein. On the other hand, many variations can be made in the organolithium compounds, the fluorine-containing organic compounds, the inert solvents, the proportions, and the conditions employed, within the limits set forth in the general description, without departing from the spirit or scope of this invention.

It will be apparent that, by this invention, there has been provided a new process, involving a novel reaction, which is simple and easy to operate to produce the desired products in good yields, and which process does not involve the difficulties, hazards, and problems of prior processes. At the same time, this invention provides new chemical compounds which have many novel and desirable properties and which have a wide range of utility. Therefore, it is apparent that this invention constitutes a valuable advance in and contribution to the art.

What is claimed is:

1. Organic fluorine compounds which are members of the class consisting of compounds having the general formula

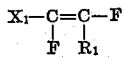

wherein $X_1$ represents a halogen atom having an atomic weight below 36, and $R_1$ represents a member of the class consisting of hydrocarbon alkyl radicals of at least 2 carbon atoms and heterocyclic radicals in which the free valence belongs to a carbon atom; compounds having the general formula $$X_1\text{---}C_nF_{2n-4}\text{---}R$$

wherein $X_1$ represents a halogen atom having an atomic weight below 36, R represents a hydrocarbon alkyl radical of at least 2 carbon atoms, and $C_nF_{2n-4}$ represents a cyclic olefinic perfluorocarbon nucleus in which $n$ is an integer of from 4 to 6; and compounds having the formula

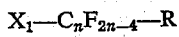

wherein $X_1$ represents a halogen atom having an atomic weight below 36, each R represents a hydrocarbon alkyl radical of at least 2 carbon atoms, and $C_nF_{2n-5}$ represents a cyclic olefinic perfluorocarbon nucleus in which $n$ is an integer from 4 to 6.

2. Organic fluorine compounds having the general formula

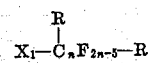

wherein $X_1$ represents a halogen atom having an atomic weight below 36 and $R_1$ represents a hydrocarbon alkyl radical of at least 2 carbon atoms.

3. n-Butyl trifluoroethylene.

4. Organic fluorine compounds having the general formula

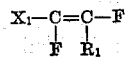

wherein $X_1$ represents a halogen atom having an atomic weight below 36 and $R_1$ represents a heterocyclic radical in which the free valence belongs to a carbon atom.

5. 2-(2-chloro-1,2-difluorovinyl)furan.

6. Organic fluorine compounds having the general formula $$X_1\text{---}C_nF_{2n-4}\text{---}R$$

wherein $X_1$ represents a halogen atom having an atomic weight below 36, R represents a hydrocarbon alkyl radical of at least 2 carbon atoms, and $C_nF_{2n-4}$ represents a cyclic olefinic perfluorocarbon nucleus in which $n$ is an integer of from 4 to 6.

7. Mono-n-butyl perfluorocyclobutene.

8. Organic fluorine compounds having the general formula

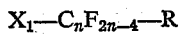

wherein $X_1$ represents a halogen atom having an atomic weight below 36, each R represents a hydrocarbon alkyl radical of at least 2 carbon atoms, and $C_nF_{2n-5}$ represents a cyclic olefinic perfluorocarbon nucleus in which $n$ is an integer of from 4 to 6.

9. Di-n-butyl perfluorocyclobutene.

10. The process which comprises dissolving in an inert organic solvent an organolithium compound and an organic fluorine compound which is a member of the class consisting of compounds having the general formula

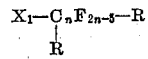

wherein Y represents a member of the group consisting of F and perfluoroalkyl radicals, and each X represents an electronegative group which is a member of the group consisting of halogen atoms having an atomic weight below 36, phenyl radicals and perfluoroalkyl radicals, and compounds having the general formula

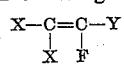

wherein X represents an electronegative group which is a member of the group consisting of halogen atoms having an atomic weight below 36, phenyl radicals, and perfluoroalkyl radicals, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

11. The process which comprises dissolving in an inert organic solvent an organolithium compound and an organic fluorine compound having the general formula

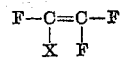

wherein X represents a halogen atom having an atomic weight below 36, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

12. The process which comprises dissolving in an inert organic solvent an organolithium compound and an organic fluorine compound having the general formula

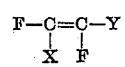

wherein Y represents a perfluoroalkyl radical, and X represents a halogen atom having an atomic weight below 36, maintaining the solution in the liquid state until the reaction is complete, and recovering a product in which the organic radical of the organolithium com- 13. The process which comprises dissolving in an inert organic solvent an organolithium compound in which the organic radical is a hydrocarbon radical and an organic fluorine compound which is a member of the class consisting of compounds having the general formula

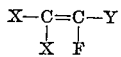

wherein Y represents a member of the group consisting of F and perfluoroalkyl radicals, and each X represents an electronegative group which is a member of the group consisting of halogen atoms having an atomic weight below 36, phenyl radicals and perfluoroalkyl radicals, and compounds having the general formula

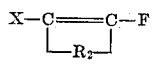

wherein X represents an electronegative group which is a member of the group consisting of halogen atoms having an atomic weight below 36, phenyl radicals, and perfluoroalkyl radicals, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

14. The process which comprises dissolving in an inert organic solvent an organolithium compound in which the organic radical is a hydrocarbon radical and an organic fluorine compound having the general formula

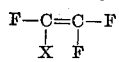

wherein X represents a halogen atom having an atomic weight below 36, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

15. The process which comprises dissolving in an inert organic solvent an organolithium compound in which the organic radical is a hydrocarbon radical and an organic fluorine compound having the general formula

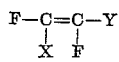

wherein Y represents a perfluoroalkyl radical, and X represents a halogen atom having an atomic weight below 36, maintaining the solution in the liquid state until the reaction is complete, and recovering a product in which the organic radical of the organolithium compound has been attached to at least one of the originally doubly bonded carbon atoms of the organic fluorine compound and at least one fluorine atom has beeen removed from the organic fluorine compound.

16. The process which comprises dissolving in an inert organic solvent an organolithium compound in which the organic radical is an alkyl radical of at least 2 carbon atoms and an organic fluorine compound which is a member of the class consisting of compounds having the general formula

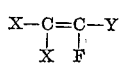

wherein Y represents a member of the group consisting of F and perfluoroalkyl radicals, and each X represents an electronegative group which is a member of the group consisting of halogen atoms having an atomic weight below 36, phenyl radicals and perfluoroalkyl radicals, and compounds having the general formula

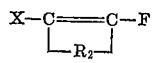

wherein X represents an electronegative group which is a member of the group consisting of halogen atoms having an atomic weight below 36, phenyl radicals, and perfluoroalkyl radicals, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

17. The process which comprises dissolving in an inert organic solvent an organolithium compound in which the organic radical is a heterocyclic radical and an organic fluorine compound which is a member of the class consisting of compounds having the general formula

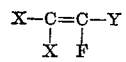

wherein Y represents a member of the group consisting of F and perfluoroalkyl radicals, and each X represents an electronegative group which is a member of the group consisting of halogen atoms having an atomic weight below 36, phenyl radicals and perfluoroalkyl radicals, and compounds having the general formula

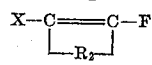

wherein X represents an electronegative group which is a member of the group consisting of halogen atoms having an atomic weight below 36, phenyl radicals, and perfluoroalkyl radicals, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

18. The process which comprises dissolving in an inert organic solvent an organolithium compound and an organic fluorine compound having the general formula

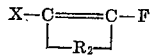

wherein X represents a halogen atom having an atomic weight below 36, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

19. The process which comprises dissolving in an inert organic solvent an organolithium compound and an organic fluorine compound having the general formula

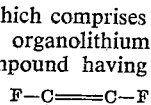

wherein $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

20. The process which comprises dissolving in an inert organic solvent an organolithium compound in which the organic radical is a hydrocarbon radical and an organic fluorine compound having the general formula

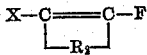

wherein X represents a halogen atom having an atomic weight below 36, and $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compound has been attached to at least one of the originally doubly bonded carbon atoms of the organic fluorine compound and at least one fluorine atom has been removed from the organic fluorine compound.

21. The process which comprises dissolving in an inert organic solvent an organolithium compound in which the organic radical is a hydrocarbon radical and an organic fluorine compound having the general formula

wherein $R_2$ represents a divalent perfluorocarbon chain of at least 2 carbon atoms which forms a cyclic ring with the doubly bonded carbon atoms, maintaining the solution in the liquid state until the reaction is complete, and recovering a product in which the organic radical of the organolithium compounds has been attached to at least one of the originally doubly bonded carbon atoms of the organic fluorine compound and at least one fluorine atom has been removed from the organic fluorine compound.

References Cited in the file of this patent

UNITED STATES PATENTS

| | | |
|---|---|---|
| 2,171,867 | Scott et al. | Sept. 5, 1939 |
| 2,401,850 | Whitman | June 11, 1946 |
| 2,543,530 | Kropa | Feb. 27, 1951 |
| 2,546,997 | Gochenour | Apr. 3, 1951 |
| 2,574,480 | Hillyer et al. | Nov. 13, 1951 |
| 2,635,121 | Smith et al. | Apr. 14, 1953 |
| 2,668,182 | Miller | Feb. 2, 1954 |
| 2,668,864 | Hals et al. | Feb. 9, 1954 |
| 2,704,769 | La Zerte | Mar. 22, 1955 |
| 2,729,613 | Miller | Jan. 3, 1956 |
| 2,733,278 | Anderson | Jan. 31, 1956 |
| 2,746,997 | Reid et al. | May 22, 1956 |
| 2,804,484 | Tarrant et al. | Aug. 27, 1957 |

OTHER REFERENCES

Wittig: "Newer Methods of Preparative Organic Chemistry," Interscience Publishers, N. Y., 1948, pp. 583–584.

Hatch et al.: J. A. C. S. 74, pp. 3328–3330 (1952).

Tarrant et al.: J. A. C. S., vol. 76, pages 1624–5 (1954), (effective date September 1952).

UNITED STATES PATENT OFFICE
CERTIFICATE OF CORRECTION

February 17, 1959

Patent No. 2,874,166

Stanley Dixon

It is hereby certified that error appears in the printed specification of the above numbered patent requiring correction and that the said Letters Patent should read as corrected below.

Column 3, line 44, for "perfloroalkyl" read -- perfluoroalkyl --; column 6, line 71, for "equeous" read -- aqueous --; column 10, line 26, for "produce" read -- product --; column 11, line 2, for "H, 2%" read -- H, 2.2% --; column 13, line 70, for "$F_2$" read -- F --; column 18, line 6, for "compounds" read -- compound --.

Signed and sealed this 21st day of July 1959.

(SEAL)
Attest:

KARL H. AXLINE

Attesting Officer

ROBERT C. WATSON
Commissioner of Patents